(12) United States Patent
Feng (10) Patent No.: US 11,200,406 B2
(45) Date of Patent: Dec. 14, 2021

(54) CUSTOMER FLOW STATISTICAL METHOD, APPARATUS AND DEVICE

(71) Applicant: Hangzhou Hikvision Digital Technology Co., Ltd., Zhejiang (CN)

(72) Inventor: Renguang Feng, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 137 days.

(21) Appl. No.: 16/647,210

(22) PCT Filed: Sep. 14, 2018

(86) PCT No.: PCT/CN2018/105721
§ 371 (c)(1),
(2) Date: Mar. 13, 2020

(87) PCT Pub. No.: WO2019/052536
PCT Pub. Date: Mar. 21, 2019

(65) Prior Publication Data
US 2021/0158024 A1    May 27, 2021

(30) Foreign Application Priority Data
Sep. 15, 2017  (CN) .......................... 201710833820.2

(51) Int. Cl.
*G06K 9/00* (2006.01)
*G06T 7/20* (2017.01)

(52) U.S. Cl.
CPC ...... *G06K 9/00288* (2013.01); *G06K 9/00711* (2013.01); *G06T 7/20* (2013.01);
(Continued)

(58) Field of Classification Search
CPC .......... G06K 9/00288; G06K 9/00711; G06K 9/00771; G06K 9/00724; G06K 9/00778;
(Continued)

(56) References Cited

U.S. PATENT DOCUMENTS

2004/0247177 A1   12/2004  Rowe et al.
2008/0080743 A1*   4/2008  Schneiderman ..... G08B 13/196
                                                        382/118
(Continued)

FOREIGN PATENT DOCUMENTS

CN    101325690 A    12/2008
CN    101877058 A    11/2010
(Continued)

OTHER PUBLICATIONS

Translated version of CN105574497 (Year: 2016).*
(Continued)

*Primary Examiner* — Carol Wang
(74) *Attorney, Agent, or Firm* — Bret E. Field; Bozicevic, Field & Francis LLP (57) ABSTRACT

Disclosed is a statistical method, apparatus and device for customer flow. The method includes: acquiring video data on which the statistics is to be made (S101), identifying facial areas in the video data (S102), matching the identified facial areas with pre-set facial information, wherein the pre-set facial information may be facial information of a person unrelated to the customer flow (for example, a staff, etc.); determining the number of successfully matched facial areas, to obtain the customer flow without unrelated persons (S103). It can be seen that the method removes the interference from unrelated persons and improves the accuracy of customer flow statistics.

15 Claims, 3 Drawing Sheets

(52) U.S. Cl.
CPC ............... *G06T 2207/30201* (2013.01); *G06T 2207/30242* (2013.01)

(58) Field of Classification Search
CPC .. G06K 9/00255; G06K 9/00295; G06T 7/20; G06T 7/246; G06T 2207/30201; G06T 2207/30242; G06T 2207/10016
See application file for complete search history.

(56) References Cited

U.S. PATENT DOCUMENTS

| | | | | |
|---|---|---|---|---|
| 2009/0268028 | A1* | 10/2009 | Ikumi | H04N 7/181 348/150 |
| 2014/0161316 | A1* | 6/2014 | Golan | G06K 9/00261 382/103 |
| 2019/0012547 | A1* | 1/2019 | Togashi | G06K 9/00778 |
| 2019/0114563 | A1 | 4/2019 | Yukimoto | |

FOREIGN PATENT DOCUMENTS

| | | | |
|---|---|---|---|
| CN | 201699888 | U | 1/2011 |
| CN | 103065379 | A | 4/2013 |
| CN | 103793682 | A | 5/2014 |
| CN | 103839308 | A | 6/2014 |
| CN | 105574497 | A * | 5/2016 |
| CN | 106295788 | A | 1/2017 |
| CN | 106296879 | A | 1/2017 |
| CN | 106778615 | A | 5/2017 |
| JP | 2008-262435 | A | 10/2008 |
| JP | 6145210 | B1 | 6/2017 |

OTHER PUBLICATIONS

Ekenel et al., A video-based door monitoring system using local appearance-based face models, Computer Vision and Image Understanding, Feb. 6, 2010, vol. 114, p. 596-608.

* cited by examiner

CUSTOMER FLOW STATISTICAL METHOD, APPARATUS AND DEVICE

The present application claims the priority to a Chinese patent application No. 201710833820.2 filed with the China National Intellectual Property Administration on Sep. 15, 2017 and entitled "statistical method, apparatus and device for customer flow", which is incorporated herein by reference in its entirety.

TECHNICAL FIELD

The present application relates to the technical field of image processing, and in particular, to a statistical method, apparatus and device for customer flow.

BACKGROUND

The statistics is made on the customer flow in some scenes, for example, at the entrance of a mall, in front of a supermarket, and so forth. A statistical method for customer flow typically includes: disposing a capturing device in a scene, analyzing an image captured by the capturing device, determining whether there is a person that enters a store in the image, and how many people enter the store; summing the number of people entering the store during a pre-set time period, such as one day, to acquire the customer flow in one day.

In the method above, however, the entry and exit of personnel unrelated to the customer flow (for example, a staff, etc.) will disturb statistical data of the customer flow and reduce the accuracy of customer flow statistics.

SUMMARY

An object of embodiments of the present application is to provide a statistical method, apparatus and device for customer flow, so as to improve the accuracy of customer flow statistics.

To achieve the above object, an embodiment of the present application provides a statistical method for customer flow, which is applied to an electronic device, the method includes:

acquiring video data on which the statistics is to be made;

identifying facial areas in the video data; and matching the identified facial areas with pre-set facial information, and determining the number of unsuccessfully matched facial areas as a customer flow in the video data.

Optionally, after identifying facial areas in the video data, the method may further include:

determining the number of the identified facial areas as a first number;

determining the number of unsuccessfully matched facial areas as the customer flow in the video data may include:

determining the number of successfully matched facial areas as a second number; and calculating a difference between the first number and the second number as the customer flow in the video data.

Optionally, matching the identified facial areas with the pre-set facial information and determining the number of unsuccessfully matched facial areas as the customer flow in the video data may include:

for each identified facial area, matching the facial area with the pre-set facial information; and if the matching is unsuccessful, increasing a value recorded in a counter by 1; and after the matching of each identified facial area with the pre-set facial information is completed, reading the value recorded in the counter as the customer flow in the video data.

Optionally, acquiring the video data on which the statistics is to be made includes: receiving the video data on which the statistics is to be made, sent by a specified capturing device;

or, the electronic device is a capturing device; and acquiring the video data on which the statistics is to be made may include:

determining whether there is a person in the captured video data, and when there is the person in the captured video data, determining the captured video data as the video data on which the statistics is to be made;

or, the electronic device is a capturing device; and acquiring the video data on which the statistics is to be made may include:

after receiving alarm information, performing video capture to obtain the video data on which the statistics is to be made, wherein the alarm information is sent by an alarm device after detecting that a person enters a pre-set scene area.

Optionally, the specified capturing device is disposed in a scene where the statistics is made on the customer flow; a height of the specified capturing device is in the range of 2 to 4 meters above a ground of the scene, and a depression angle of the specified capturing device is in the range of 20 to 45 degrees;

or, when the electronic device is the capturing device, the electronic device is disposed in a scene wherein the statistics is made on the customer flow, a height of the electronic device is in the range of 2 to 4 meters above a ground of the scene, and a depression angle of the electronic device is in the range of 20 to 45 degrees.

Optionally, identifying the facial areas in the video data may include:

determining persons in the video data as tracking targets for tracking; and identifying one facial area of each tracking target.

Optionally, the pre-set facial information is obtained by the following steps:

for each pre-set person, acquiring one or more facial images of the person;

constructing a facial model of the person according to the one or more facial images; wherein the facial models of all pre-set persons form the pre-set facial information;

the step of matching the identified facial areas with pre-set facial information, and determining the number of unsuccessfully matched facial areas as a customer flow in the video data, may include:

for each identified facial area, matching the facial area with the facial model of each pre-set person;

when the facial area matches a facial model, determining the facial area as a successfully matched facial area; and counting the number of unsuccessfully matched facial areas as the customer flow in the video data.

To achieve the above object, an embodiment of the present application further provides a statistical apparatus for customer flow, which is applied to an electronic device, the apparatus includes:

a first acquisition module, configured for acquiring video data on which the statistics is to be made;

an identification module, configured for identifying facial areas in the video data;

a matching module, configured for matching the identified facial areas with pre-set facial information, and determining the number of unsuccessfully matched facial areas as a customer flow in the video data.

Optionally, the apparatus may further include:

a first determination module, configured for determining the number of the identified facial areas as a first number;

the matching module may be further configured for:

matching the identified facial areas with the pre-set facial information;

determining the number of successfully matched facial areas as a second number;

calculating a difference between the first number and the second number as the customer flow in the video data.

Optionally, the matching module is further configured for:

for each identified facial area, matching the facial area with the pre-set facial information; and if the matching is unsuccessful, increasing a value recorded in a counter by 1;

after the matching of each identified facial area with the pre-set facial information is completed, reading the value recorded in the counter as the customer flow in the video data.

Optionally, the first acquisition module may be further configured for: receiving the video data on which the statistics is to be made, sent by a specified capturing device;

or, the electronic device is a capturing device; the first acquisition module may be further configured for:

determining whether there is a person in the captured video data, and when there is the person in the captured video data, determining the captured video data as the video data on which the statistics is to be made;

or, the electronic device is a capturing device; the first acquisition module may be further configured for:

after receiving alarm information, performing video capture to obtain the video data on which the statistics is to be made, wherein the alarm information is sent by an alarm device after detecting that a person enters a pre-set scene area.

Optionally, the specified capturing device is disposed in a scene where the statistics is made on the customer flow; a height of the specified capturing device is in the range of 2 to 4 meters above a ground of the scene, and a depression angle of the specified capturing device is in the range of 20 to 45 degrees;

or, in case the electronic device is the capturing device, the electronic device is disposed in a scene where the statistics is made on the customer flow, a height of the electronic device is in the range of 2 to 4 meters above a ground of the scene, and a depression angle of the electronic device is in the range of 20 to 45 degrees.

Optionally, the identification module may be further configured for:

determining persons in the video data as tracking targets for tracking; and identifying one facial area of each tracking target.

Optionally, the apparatus may further include:

a second acquisition module, configured for, for each pre-set person, acquiring one or more facial images of the person;

a construction module, configured for constructing a facial model of the person according to the one or more facial images; wherein the facial models of all pre-set persons form the pre-set facial information;

the matching module is further configured for:

for each identified facial area, matching the facial area with the facial model of each pre-set person;

when the facial area matches a facial model, determining the facial area as a successfully matched facial area; and counting the number of unsuccessfully matched facial areas as the customer flow in the video data.

To achieve the above objective, an embodiment of the present application further provides an electronic device, which includes a processor and a memory, wherein the memory stores a computer program;

the processor, when executing the program stored in the memory, implements any of the above statistical methods for customer flow.

To achieve the above object, an embodiment of the present application further provides a computer-readable storage medium. A computer program is stored in the computer-readable storage medium. The computer program is executed by a processor, so as to cause the processor to perform any of the above statistical methods for customer flow.

To achieve the above object, an embodiment of the present application further provides a statistical system for customer flow, which includes a capturing device and a statistical device.

The capturing device is configured for capturing video data on which the statistics is to be made, and sending the video data to the statistical device.

The statistical device is configured for receiving the video data on which the statistics is to be made; identifying facial areas in the video data; matching the identified facial areas with pre-set facial information, and determining the number of unsuccessfully matched facial areas as a customer flow in the video data.

Optionally, the capturing device is disposed in a scene where the statistics is made on the customer flow, a height of the capturing device is in the range of 2 to 4 meters above a ground of the scene, and a depression angle of the capturing device is in the range of 20 to 45 degrees.

The statistical device may perform any one of the foregoing statistical methods for customer flow.

To achieve the above objective, an embodiment of the present application further provides an executable program code which, when executed, performs any one of the foregoing statistical methods for customer flow.

In the embodiments illustrated in the present application, facial areas in video data are identified; the identified facial areas are matched with pre-set facial information, wherein the pre-set facial information may be facial information of a person unrelated to the customer flow (for example, a staff, etc.); the number of unsuccessfully matched facial areas is determined, to obtain the customer flow without unrelated persons. It can be seen that the solution of the present application removes the interference from unrelated persons and improves the accuracy of customer flow statistics.

Of course, any product or method of the present application does not necessarily achieve all the advantages described above at the same time.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

In order to make the objective, technical solutions and advantages of the present application more clear, the present application is described below in detail with reference to the accompanying drawings and by way of example. Obviously, the described embodiments are only some, and not all, of the embodiments of the present application. All other embodiments obtained based on the embodiments of the present application by those skilled in the art without any creative efforts fall into the scope of protection defined by the present application.

To solve the above technical problems, embodiments of the present application provide a statistical method, apparatus and device for customer flow. The method and apparatus are applied to an electronic device. The electronic device may be a capturing device, for example, a camera having an intelligent recognition function; and may also be various devices that are communicatively connected to the capturing device, such as a server, and so on. The electronic device is not specifically defined herein.

A statistical method for customer flow provided by an embodiment of the present application is described in detail first.

Figure 1:
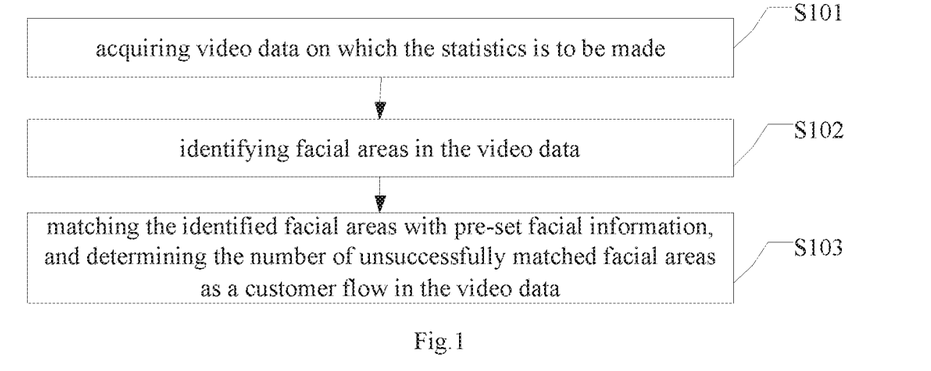
FIG. 1 is a first flowchart of a statistical method for customer flow provided by an embodiment of the present application.

FIG. 1 is a first flowchart of a statistical method for customer flow provided by an embodiment of the present application, including:

S101: acquiring video data on which the statistics is to be made.

S102: identifying facial areas in the video data.

S103: matching the identified facial areas with pre-set facial information, and determining the number of unsuccessfully matched facial areas as a customer flow in the video data.

In the embodiment illustrated in FIG. 1 of the present application, facial areas in video data are identified, and the identified facial areas are matched with pre-set facial information, wherein the pre-set facial information may be facial information of a person unrelated to the customer flow (for example, a staff, etc.); the number of unsuccessfully matched facial areas is determined, to obtain the customer flow without unrelated persons. Therefore, the solution of the present application removes the interference from unrelated persons and improves the accuracy of customer flow statistics.

The embodiment illustrated in FIG. 1 will be described below in detail.

S101: acquiring video data on which the statistics is to be made.

If an electronic device implementing this method (hereinafter referred to as an electronic device) is communicatively connected to a capturing device, S101 may include: receiving the video data on which the statistics is to be made, sent by a specified capturing device.

The specified capturing device refers to a capturing device disposed in a scene where the statistics needs to be made on the customer flow. The specified capturing device may send the captured video data to the electronic device in real time, and the electronic device makes the statistics on the customer flow in real time. Alternatively, the specified capturing device may also send the captured video data to the electronic device in non-real time, for example, the specified capturing device may send historical video data within a statistical time period to the electronic device after receiving an instruction of customer flow statistics.

The statistical time period is a time period for customer flow statistics, which may be set according to actual conditions. For example, the statistical time period may be one day, one week, one month, and so forth; or, may also be a pre-set time period in a day, such as from 9 a.m. to 9 p.m. in a day; or, may also be a pre-set time period in each day of a week or a month; or, may also be from 9 a.m. to 9 p.m. from Monday to Friday; or so on. The statistical time period is not specifically defined herein.

In this embodiment, after capturing video data the capturing device may determine whether there is a person in the video data; and if yes, the capturing device sends the video data to the electronic device as video data on which the statistics is to be made. Alternatively, the capturing device may also be connected with an alarm device, which sends alarm information to the capturing device after detecting that a person enters a pre-set scene area. The capturing device captures a video after receiving the alarm information, and sends the captured video data to the electronic device as the video data on which the statistics is to be made.

This alarm device may be an infrared sensing device. For example, a capturing device and an infrared sensing device are installed at the entrance of the shopping mall. The infrared sensing device sends alarm information to the capturing device upon detecting that a person enters into an entrance area of the shopping mall (a pre-set scene area). The capturing device is aimed at the entrance area of the shopping mall to capture video data.

Figure 2:
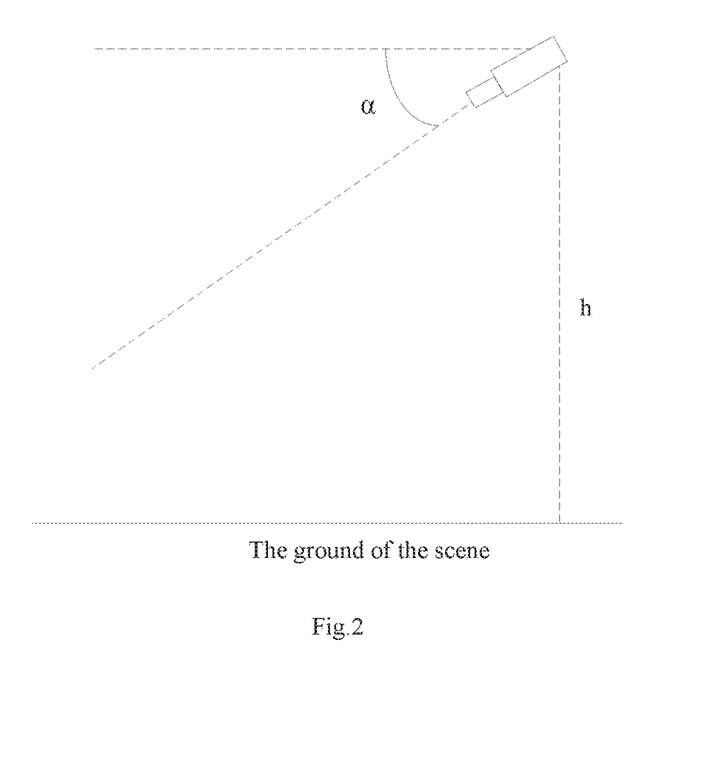
FIG. 2 is a schematic mounting diagram of a capturing device provided by an embodiment of the present application.

As mentioned above, the specified capturing device is disposed in a scene where the statistics is made on the customer flow. As an implementation, the height of the capturing device is in the range of 2 to 4 meters above a ground of the scene, and the depression angle of the specified capturing device is in the range of 20 to 45 degrees. Specifically, as shown in FIG. 2, preferably the height of the capturing device may be 3 meters (h=3 meters), and the depression angle α may be 30 degrees. It is noted that the "ground of the scene" mentioned herein does not necessarily refer to the ground. For example, if the scene is the second floor, the "ground of the scene" is the floor surface of the second floor; if the scene is an underground parking lot, the "ground of the scene" is the floor surface of the parking lot.

If an electronic device is a capturing device, i.e., the electronic device has a video capturing function, as an implementation, S101 may include: determining whether there is a person in the captured video data; and if yes, determining the captured video data as the video data on which the statistics is to be made.

As another implementation, the capturing device may also be connected with the alarm device. The alarm device sends alarm information to the capturing device after detecting that a person enters a pre-set scene area. The electronic device captures a video after receiving the alarm information, and takes the captured video data as the video data on which the statistics is to be made.

Assume the electronic device is a capturing device, and the electronic device is disposed in a scene where the statistics is made on the customer flow. As an implementation, the height of the electronic device is in the range of 2 to 4 meters above a ground of the scene, and the depression angle of the electronic device is in the range of 20 to 45 degrees. Specifically, as shown in FIG. 2, for example, the height of the electronic device may be 3 meters (h=3 meters), and the depression angle α may be 30 degrees. For example, the height of the electronic device may be 2 meters, 4 meters, 1.8 meters, 1.7 meters, or the like. The specific height may be changed according to the scene (installable position, indoor scene, etc.). The depression angle α may be comprehensively determined according to factors such as the scene and the position of the electronic device. For example, the depression angle α may be 20 degrees, 25 degrees, 21.3 degrees, 45 degrees, 45.3 degrees, and so on. Both the height and the depression angle α of the electronic device are not defined herein. It is noted that the "ground of the scene" mentioned herein does not necessarily refer to the ground. For example, if the scene is the second floor, the "ground of the scene" is the floor surface of the second floor; if the scene is an underground parking lot, the "ground of the scene" is the floor surface of the parking lot. The capturing device may be, but not limited to a camera, such as a dome camera, a camera with pan & tilt, and so on.

S102: identifying facial areas in the video data.

As an implementation, facial identification may be performed for each image in the video data, to identify a facial area in each image.

As another implementation, a person(s) in the video data may be determined as a tracking target(s) for tracking, and one facial area of each tracking target is identified.

In this implementation, target tracking is performed between adjacent frame images by a target tracking algorithm. If the same person is present in continuous multiple frame images, this person is a tracking target. For the same tracking target, only one facial area of the tracking target is identified.

S103: matching the identified facial areas with pre-set facial information, and determining the number of unsuccessfully matched facial areas as a customer flow in the video data.

As an implementation, after S102, the method may include:

determining the number of identified facial areas as a first number.

In this implementation, S103 may include:

determining the number of successfully matched facial areas as a second number; and calculating the difference between the first number and the second number as the customer flow in the video data.

Figure 3:
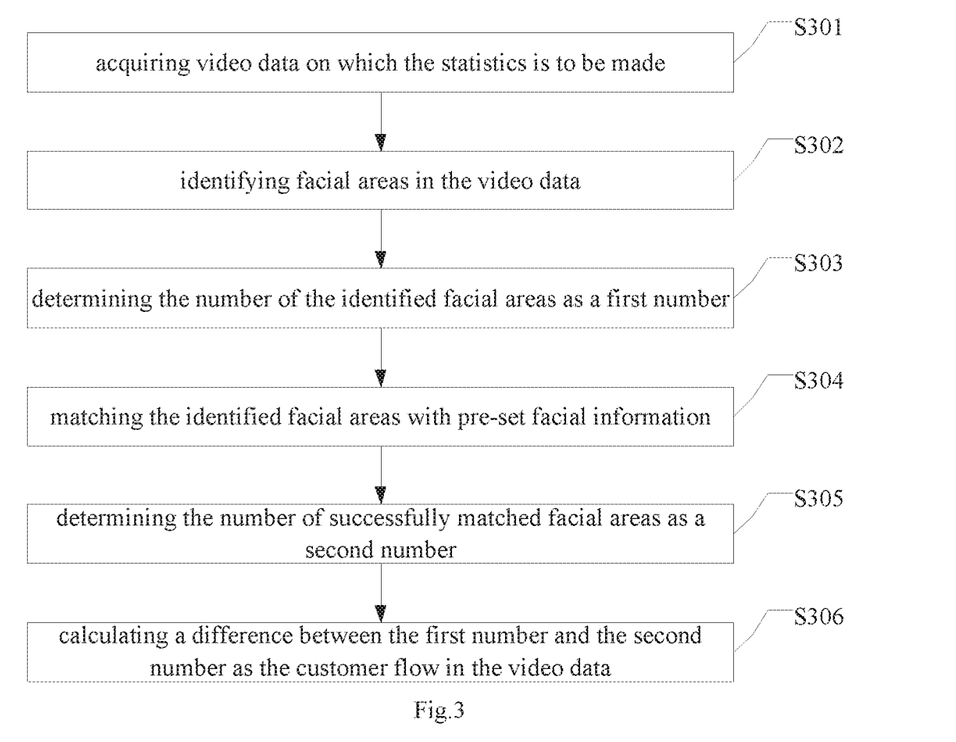
FIG. 3 is a second flowchart of a statistical method for customer flow provided by an embodiment of the present application.

A detailed description of this implementation is given in the embodiment illustrated in FIG. 3.

As another implementation, S103 may include:

matching, for each identified facial area, the facial area with the pre-set facial information; and if the matching is unsuccessful, increasing a value recorded in a counter by 1;

after the matching of each facial area with the pre-set facial information is completed, reading the value recorded in the counter as the customer flow in the video data.

In this implementation, a counter whose initially recorded value is 0 may be provided. Each identified facial area is matched with the pre-set facial information in sequence. The value recorded in the counter is increased by 1 each time the matching is unsuccessful, until the matching of all facial areas is completed. The value recorded in the counter is read, which is the number of unsuccessfully matched faces, i.e., the customer flow in the video data.

In an embodiment of the present application, facial information may be acquired in advance. As an implementation, the pre-set facial information may be acquired by taking the following steps:

acquiring, for each pre-set person, one or more facial images of the person;

constructing a facial model for the person according to the one or more facial images; wherein the facial models of all pre-set persons form pre-set facial information.

The pre-set person is a person unrelated to the customer flow, such as a staff and the like. For each pre-set person, one or more facial images of the person are acquired. According to the one or more facial images, a facial model for the person is constructed.

For example, images of different shooting angles for a staff A, such as a front image, a left facial image, a right facial image, or a head-up image, a top-view image, a bottom-view image and the like, may be acquired. The specific shooting angle is not defined. A facial model of the staff A is constructed based on the acquired images.

Alternatively, only one image of the staff A, such as a front image, may be acquired, and a facial model of the staff A may also be constructed based on the one image.

In this implementation, S103 may include:

matching, for each identified facial area, the facial area with a facial model of each pre-set person;

when the facial area matches a facial model, determining the facial area as a successfully matched facial area; and counting the number of unsuccessfully matched facial areas as the customer flow in the video data.

Alternatively, as another implementation, a facial image set of each pre-set person may be acquired. Each facial image set includes one or more facial images of one pre-set person. The pre-set facial information includes facial image sets of all pre-set persons. In this implementation, S103 may include:

matching, for each identified facial area, the facial area with the facial image set of each pre-set person;

when the facial area matches a facial model, determining the facial area as a successfully matched facial area; and counting the number of unsuccessfully matched facial areas as the customer flow in the video data.

In this implementation, if the facial area matches any facial image in the facial image set, it can be determined that the facial area matches the facial image set.

In this implementation, the facial area is matched with the facial image, and it is not necessary to create a facial model, thereby simplifying the operation.

FIG. 3 is a second flowchart of a statistical method for customer flow provided by an embodiment of the present application, including:

S301: acquiring video data on which the statistics is to be made.

S302: identifying facial areas in the video data.

S303: determining the number of identified facial areas as a first number.

S304: matching the identified facial areas with pre-set facial information.

S305: determining the number of successfully matched facial areas as a second number.

S306: calculating the difference between the first number and the second number as the customer flow in the video data.

A first number may be counted in many manners, for example, the following manners.

In the first manner, facial identification may be performed for each image in the video data, and the total number of identified facial areas is taken as the first number.

As a simple example, there are 4 images in the video data on which the statistics is to be made, 2 facial areas are identified in the first image, 3 facial areas are identified in the second image, and 2 facial areas are identified in the third image, and 1 facial area is identified in the fourth image. Thus, the first number=2+3+2+1=8.

In the second manner, a person in the video data may be determined as a tracking target for tracking; one facial area of each tracking target is identified, and the number of tracking targets in the video data is determined as the number of identified facial areas, which is the first number.

In this implementation, target tracking is performed between adjacent frame images by a target tracking algorithm. If the same person is present in continuous multiple frame images, this person is one tracking target.

For example, if a non-pre-set person is always standing in the capturing range of the capturing device, the facial area of the person would always be in the continuous multiple frame images in video data captured by the capturing device. If the first number is counted in the first manner, the person will be counted repeatedly, which will cause interference to the customer flow statistics.

However, in the second manner, the person in the video data is determined as a tracking target for tracking, and the number of tracking targets is determined as the first number. Therefore the same tracking target is counted only once, thus improving the accuracy of the counting.

On the other hand, if the same person, which exists in discontinuous multiple frame images, enters and exits the scene where the statistics is made on the customer flow multiple times, this person will be counted multiple times by the second manner. For example, the statistical time period is one day, and the person A enters and exits the scene where the statistics is made on the customer flow, once in the morning and once in the afternoon of the day, respectively; then in the second manner, this person will be taken as two tracking targets, namely be counted twice. It can be seen that the first number counted in the second manner is more reasonable.

In the above second manner of counting a first number, the number of tracking targets is taken as the first number. Only one facial area for each tracking target is identified. In this way, for each tracking target, only one facial area of the tracking target is matched with pre-set facial information in S304, thus the second number acquired is also reasonable.

As a simple example, there are four pre-set persons A, B, C, and D, a facial model A1 of person A, a facial model B1 of person B, a facial model C1 of person C, and a facial model D1 of person D are constructed.

If 3 tracking targets are determined in the video data on which the statistics is to be made, the first number is three. One facial area is identified for each tracking target, and thus 3 facial areas are identified: X, Y and Z. The facial area X is matched with four models A1, B1, C1, and D1, respectively. The facial area Y is matched with four models A1, B1, C1, and D1 respectively. The facial area Z is matched with the four models A1, B1, C1, and D1 respectively. If only Y is matched with C1, the number of successfully matched facial areas is 1, i.e., the second number is 1, and thus the customer flow of the video data is 3−1=2.

In the embodiment illustrated in FIG. 3 of the present application, facial areas in video data are identified, and the number of identified facial areas is determined as a first number; the identified facial areas are matched with pre-set facial information, wherein the pre-set facial information may be facial information of a person unrelated to the customer flow (for example, a staff, etc.); the number of successfully matched facial areas is determined as a second number, which is also the number of unrelated persons; and the difference between the first number and the second number is calculated to obtain the customer flow without unrelated persons. It can be seen that the solution of the present application removes the interference from unrelated persons and improves the accuracy of customer flow statistics.

Corresponding to the above method embodiments, an embodiment of the present application further provides a statistical apparatus for customer flow.

Figure 4:
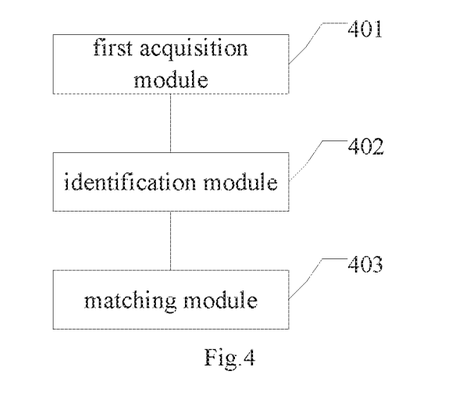
FIG. 4 is a schematic structural diagram of a statistical apparatus for customer flow provided by an embodiment of the present application.

FIG. 4 is a schematic structural diagram of a statistical apparatus for customer flow provided by an embodiment of the present application. The apparatus is applied to an electronic device, and the apparatus includes:

a first acquisition module 401, configured for acquiring video data on which the statistics is to be made;

an identification module 402, configured for identifying facial areas in the video data;

a matching module 403, configured for matching the identified facial areas with pre-set facial information, and determining the number of unsuccessfully matched facial areas as a customer flow in the video data.

As an implementation, the apparatus may further include:

a first determination module (not shown), configured for determining the number of the identified facial areas as a first number.

The matching module 403 is further configured for:

matching the identified facial areas with the pre-set facial information;

determining the number of successfully matched facial areas as a second number; and calculating a difference between the first number and the second number as the customer flow in the video data.

As an implementation, the matching module 403 may be further configured for:

for each identified facial area, matching the facial area with the pre-set facial information; and if the matching is unsuccessful, increasing a value recorded in a counter by 1; and after the matching of each identified facial area with the pre-set facial information is completed, reading the value recorded in the counter as the customer flow in the video data.

As an implementation, the first acquisition module 401 may be further configured for: receiving the video data on which the statistics is to be made, sent by a specified capturing device.

Alternatively, the electronic device is a capturing device; and the first acquisition module 401 may be further configured for:

determining whether there is a person in the captured video data, and when there is the person in the captured video data, determining the captured video data as the video data on which the statistics is to be made.

Alternatively, the electronic device is a capturing device; the first acquisition module 401 may be further configured for:

after receiving alarm information, performing video capture to obtain the video data on which the statistics is to be made, wherein the alarm information is sent by an alarm device after detecting that a person enters a pre-set scene area.

As an implementation, the specified capturing device is disposed in a scene where the statistics is made on the customer flow; a height of the specified capturing device is in the range of 2 to 4 meters above a ground of the scene, and a depression angle of the specified capturing device is in the range of 20 to 45 degrees.

Alternatively, in case the electronic device is the capturing device, the electronic device is disposed in a scene where the statistics is made on the customer flow, a height of the electronic device is in the range of 2 to 4 meters above a ground of the scene, and a depression angle of the electronic device is in the range of 20 to 45 degrees.

Optionally, the height of the electronic device may also be 1.8 meters, 2 meters, 2.2 meters, 4 meters, 4.5 meters, and so on. The height and the depression angle of the electronic device may be comprehensively determined according to factors such as the scene and the installable position. For example, the depression angle α may be 20 degrees, 25 degrees, 21.3 degrees, 45 degrees, 45.3 degrees, and so on. The height and the depression angle are not defined herein.

As an implementation, the identification module 402 may be further configured for:

determining persons in the video data as tracking targets for tracking; and identifying one facial area of each tracking target.

As an implementation, the apparatus may further include: a second acquisition module and a construction module (not shown).

The second acquisition module is configured for, for each pre-set person, acquiring one or more facial images of the person.

The construction module is configured for constructing a facial model of the person according to the one or more facial images; wherein the facial models of all pre-set persons form the pre-set facial information.

The matching module 403 may be further configured for:

for each identified facial area, matching the facial area with the facial model of each pre-set person;

when the facial area matches a facial model, determining the facial area as a successfully matched facial area; and counting the number of unsuccessfully matched facial areas as the customer flow in the video data.

In the embodiment illustrated in FIG. 4 of the present application, facial areas in video data are identified; the identified facial areas are matched with pre-set facial information, wherein the pre-set facial information may be facial information of a person unrelated to the customer flow (for example, a staff, etc.); the number of unsuccessfully matched facial areas is determined to obtain the customer flow without unrelated persons. It can be seen that the solution of the present application removes the interference from unrelated persons and improves the accuracy of customer flow statistics.

Figure 5:
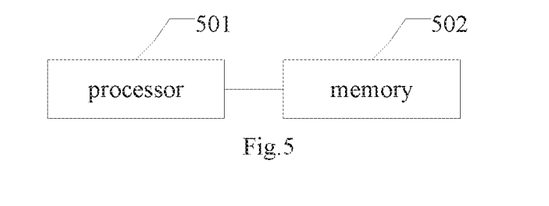
FIG. 5 is a schematic structural diagram of an electronic device provided by an embodiment of the present application.

An embodiment of the present application further provides an electronic device. As shown in FIG. 5, the electronic device includes a processor 501 and a memory 502.

The memory 502 stores a computer program.

The processor 501 implements any one of the foregoing statistical methods for customer flow when executing the program stored in the memory 502.

The memory mentioned in the above electronic device may include Random Access Memory (RAM), and may further include Non-Volatile Memory (NVM), such as at least one disk memory. Optionally, the memory may also be at least one storage device located away from the foregoing processor.

The foregoing processor may be a general processor, including a Central Processing Unit (CPU), a Network Processor (NP), etc.; may also be a Digital Signal Processing (DSP), an Application Specific Integrated Circuit (ASIC), a Field-Programmable Gate Array (FPGA) or other programmable logic devices, discrete gate or transistor logic devices, discrete hardware components.

An embodiment of the present application further provides a computer-readable storage medium. A computer program is stored in the computer-readable storage medium. The computer program is executed by a processor so as to cause the processor to perform any one of the foregoing statistical methods for customer flow.

Figure 6:
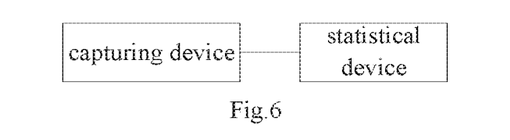
FIG. 6 is a schematic structural diagram of a statistical system for customer flow provided by an embodiment of the present application.

An embodiment of the present application further provides a statistical system for customer flow, as shown in FIG. 6, including: a capturing device and a statistical device.

The capturing device is configured for capturing video data on which the statistics is to be made, and sending the video data to the statistical device.

The statistical device is configured for receiving the video data on which the statistics is to be made; identifying facial areas in the video data; matching the identified facial areas with pre-set facial information, and determining the number of unsuccessfully matched facial areas as a customer flow in the video data.

As an implementation, the capturing device is disposed in a scene where the statistics is made on the customer flow. A height of the capturing device is in the range of 2 to 4 meters above a ground of the scene, and a depression angle of the capturing device is in the range of 20 to 45 degrees.

The statistical device may perform any one of the foregoing statistical methods for customer flow.

An embodiment of the present application further provides an executable program code which, when executed, performs any one of the foregoing statistical methods for customer flow.

In the embodiment illustrated in the present application, facial areas in video data are identified; the identified facial areas are matched with pre-set facial information, wherein the pre-set facial information may be facial information of a person unrelated to the customer flow (for example, a staff, etc.); the number of unsuccessfully matched facial areas is determined to obtain the customer flow without unrelated persons. It can be seen that the solution of the present application removes the interference from unrelated persons and improves the accuracy of customer flow statistics.

It should be noted that the relationship terms used in the specification and claims, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . "

do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the statistical apparatus for customer flow shown in FIG. 4, the electronic device shown in FIG. 5, the above storage medium, the executable program code, the statistical system for customer flow shown in FIG. 6 are described briefly, since they are substantially similar to the embodiments of the method shown in FIGS. 1-3, and the related contents can refer to the description of the embodiments of the method shown in FIGS. 1-3.

The embodiments mentioned above are merely preferred embodiments of the present application, and are not intended to limit the protection scope of the present application. Any modifications, equivalent replacements, and improvements and the like that are made within the spirit and principle of the present application are included in the protection scope of this application.

What is claimed is:

1. A statistical method for customer flow, applied to an electronic device, comprising:
    acquiring video data on which statistics are to be made;
    identifying facial areas in the video data; and
    matching the identified facial areas with pre-set facial information, and determining a number of unsuccessfully matched facial areas as a customer flow in the video data;
    wherein after identifying facial areas in the video data, the method further comprises:
    determining a number of the identified facial areas as a first number;
    wherein determining the number of unsuccessfully matched facial areas as the customer flow in the video data comprises:
    determining a number of successfully matched facial areas as a second number; and
    calculating a difference between the first number and the second number as the customer flow in the video data.

2. The method according to claim 1, wherein, matching the identified facial areas with the pre-set facial information and determining the number of unsuccessfully matched facial areas as the customer flow in the video data comprises:
    for each identified facial area, matching the identified facial area with the pre-set facial information; and if the matching is unsuccessful, increasing a value recorded in a counter by 1; and
    after the matching of each identified facial area with the pre-set facial information is completed, reading the value recorded in the counter as the customer flow in the video data.

3. The method according to claim 1, wherein, acquiring the video data on which the statistics are to be made comprises: receiving the video data on which the statistics are to be made, sent by a specified capturing device;
    or, the electronic device is a capturing device; and acquiring the video data on which the statistics are to be made comprises:
    determining whether there is a person in the captured video data, and when there is the person in the captured video data, determining the captured video data as the video data on which the statistics are to be made; or, after receiving alarm information, performing video capture to obtain the video data on which the statistics are to be made, wherein the alarm information is sent by an alarm device after detecting that a person enters a pre-set scene area.

4. The method according to claim 3, wherein the specified capturing device is disposed in a scene where the statistics are made on the customer flow; a height of the specified capturing device is in a range of 2 to 4 meters above a ground of the scene, and a depression angle of the specified capturing device is in a range of 20 to 45 degrees;
    or, in case the electronic device is the capturing device,
    the electronic device is disposed in a scene where the statistics are made on the customer flow, a height of the electronic device is in the range of 2 to 4 meters above a ground of the scene, and a depression angle of the electronic device is in the range of 20 to 45 degrees.

5. The method according to claim 1, wherein, identifying the facial areas in the video data comprises:
    determining persons in the video data as tracking targets for tracking; and
    identifying one facial area of each tracking target.

6. The method according to claim 1, wherein the pre-set facial information is obtained by the following steps:
    for a plurality of pre-set persons, acquiring one or more facial images of each pre-set person;
    constructing a facial model of each pre-set person according to the one or more facial images; wherein facial models of all pre-set persons form the pre-set facial information;
    the step of matching the identified facial areas with pre-set facial information, and determining the number of unsuccessfully matched facial areas as the customer flow in the video data, comprises:
    for each identified facial area, matching the identified facial area with the facial model of each pre-set person;
    when each identified facial area matches a facial model, determining the identified facial area as a successfully matched facial area; and
    counting the number of unsuccessfully matched facial areas as the customer flow in the video data.

7. A non-transitory computer-readable storage medium, wherein, a computer program is stored in the computer readable storage medium; the computer program is executed by a processor, so as to cause the processor to perform the method of claim 1.

8. An electronic device, comprising a processor and a memory, wherein the memory stores a computer program;
    the processor, when executing the program stored in the memory, implements a statistical method for customer flow, comprising:
    acquiring video data on which statistics are to be made;
    identifying facial areas in the video data; and
    matching the identified facial areas with pre-set facial information, and determining a number of unsuccessfully matched facial areas as a customer flow in the video data;
    wherein after identifying facial areas in the video data, the statistical method further comprises:
    determining a number of the identified facial areas as a first number;
    wherein determining the number of unsuccessfully matched facial areas as the customer flow in the video data comprises:
    determining a number of successfully matched facial areas as a second number; and calculating a difference between the first number and the second number as the customer flow in the video data.

9. The electronic device according to claim 8, wherein, matching the identified facial areas with the pre-set facial information and determining the number of unsuccessfully matched facial areas as the customer flow in the video data comprises:
for each identified facial area, matching the identified facial area with the pre-set facial information; and
if the matching is unsuccessful, increasing a value recorded in a counter by 1; and
after the matching of each identified facial area with the pre-set facial information is completed, reading the value recorded in the counter as the customer flow in the video data.

10. The electronic device according to claim 8, wherein, acquiring the video data on which the statistics are to be made comprises: receiving the video data on which the statistics are to be made, sent by a specified capturing device;
or, the electronic device is a capturing device; and acquiring the video data on which the statistics are to be made comprises:
determining whether there is a person in the captured video data, and when there is the person in the captured video data, determining the captured video data as the video data on which the statistics are to be made;
or,
after receiving alarm information, performing video capture to obtain the video data on which the statistics are to be made, wherein the alarm information is sent by an alarm device after detecting that a person enters a pre-set scene area.

11. The electronic device according to claim 10, wherein the specified capturing device is disposed in a scene where the statistics are made on the customer flow; a height of the specified capturing device is in a range of 2 to 4 meters above a ground of the scene, and a depression angle of the specified capturing device is in a range of 20 to 45 degrees;
or, in case the electronic device is the capturing device, the electronic device is disposed in a scene where the statistics are made on the customer flow, a height of the electronic device is in the range of 2 to 4 meters above a ground of the scene, and a depression angle of the electronic device is in the range of 20 to 45 degrees.

12. The electronic device according to claim 8, wherein, identifying the facial areas in the video data comprises:
determining persons in the video data as tracking targets for tracking; and
identifying one facial area of each tracking target.

13. The electronic device according to claim 8, wherein the pre-set facial information is obtained by the following steps:
for a plurality of pre-set persons, acquiring one or more facial images of each pre-set person;
constructing a facial model of each pre-set person according to the one or more facial images; wherein facial models of all pre-set persons form the pre-set facial information:
the step of matching the identified facial areas with pre-set facial information, and determining the number of unsuccessfully matched facial areas as the customer flow in the video data, comprises:
for each identified facial area, matching the identified facial area with the facial model of each pre-set person;
when each identified facial area matches a facial model, determining the identified facial area as a successfully matched facial area; and
counting the number of unsuccessfully matched facial areas as the customer flow in the video data.

14. A statistical system for customer flow, comprising a capturing device and a statistical device, wherein, the capturing device is configured for capturing video data on which statistics are to be made, and sending the video data to the statistical device; and
the statistical device is configured for receiving the video data on which the statistics are to be made;
identifying facial areas in the video data;
matching the identified facial areas with pre-set facial information, and determining a number of unsuccessfully matched facial areas as a customer flow in the video data;
wherein after identifying facial areas in the video data, the statistical device is further configured for:
determining a number of the identified facial areas as a first number;
wherein determining the number of unsuccessfully matched facial areas as the customer flow in the video data comprises:
determining a number of successfully matched facial areas as a second number; and
calculating a difference between the first number and the second number as the customer flow in the video data.

15. The system of claim 14, wherein the capturing device is disposed in a scene where the statistics are made on the customer flow, a height of the capturing device is in a range of 2 to 4 meters above a ground of the scene, and a depression angle of the capturing device is in a range of 20 to 45 degrees.

* * * * *